US012388197B2

(12) United States Patent
Tanaka

(10) Patent No.: US 12,388,197 B2
(45) Date of Patent: Aug. 12, 2025

(54) CONNECTOR

(71) Applicant: JAPAN AVIATION ELECTRONICS INDUSTRY, LIMITED, Tokyo (JP)

(72) Inventor: Masashi Tanaka, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 320 days.

(21) Appl. No.: 18/142,716

(22) Filed: May 3, 2023

(65) Prior Publication Data

US 2024/0006781 A1 Jan. 4, 2024

(30) Foreign Application Priority Data

Jul. 1, 2022 (JP) ................................ 2022-107108

(51) Int. Cl.

| | |
|---|---|
| ***H01R 4/2433*** | (2018.01) |
| ***H01R 13/42*** | (2006.01) |
| ***H01R 13/502*** | (2006.01) |

(52) U.S. Cl.

CPC ........... *H01R 4/2433* (2013.01); *H01R 13/42* (2013.01); *H01R 13/502* (2013.01)

(58) Field of Classification Search

CPC ..... H01R 4/2433; H01R 13/42; H01R 13/502
USPC .................................................. 439/417, 404
See application file for complete search history.

(56) References Cited

U.S. PATENT DOCUMENTS

| | | | | |
|---|---|---|---|---|
| 7,357,661 B2 | 4/2008 | Yamamoto et al. | | |
| 8,840,424 B2 * | 9/2014 | Kudo | H01R 4/2429 | 439/417 |
| 2010/0227496 A1 * | 9/2010 | Sticker | H01R 24/64 | 439/417 |

FOREIGN PATENT DOCUMENTS

| | | | | |
|---|---|---|---|---|
| CN | 102844935 A | * | 12/2012 | F21S 4/20 |
| CN | 109478742 A | * | 3/2019 | H01R 13/506 |
| DE | 102012210113 A1 | * | 12/2012 | H01R 13/6592 |
| EP | 2731206 A1 | | 5/2014 | |
| JP | 2000012109 A | | 1/2000 | |
| JP | 2003173827 A | | 6/2003 | |
| JP | 2004055515 A | | 2/2004 | |
| JP | 2006236854 A | | 9/2006 | |
| JP | 2006236855 A | | 9/2006 | |
| JP | 2008053096 A | | 3/2008 | |
| JP | 2019021462 A | | 2/2019 | |

OTHER PUBLICATIONS

Extended European Search Report (EESR) dated Nov. 14, 2023, issued in counterpart European Application No. 23172278.6.

* cited by examiner

*Primary Examiner* — Gary F Paumen

(74) *Attorney, Agent, or Firm* — Holtz, Holtz & Volek PC

(57) ABSTRACT

A locator of a connector is attached to a shell so that it is moveable from a first position to a second position. The shell is made of metal, and each of side wall portions thereof is provided with a first aperture and a second aperture. The locator is provided with protruding portions. When the locator is positioned at the first position, each of the protruding portions is in the first aperture. When the locator is positioned at the second position, the protruding portion is in the second aperture. The shell is made of metal, so that it has predetermined strength even if the first aperture and the second aperture are provided therein. Since the first aperture and the second aperture pierce the side wall portion in a width direction, the protruding portions of the locator are visible. Thus, a position of the locator can be grasped.

16 Claims, 13 Drawing Sheets

CONNECTOR

CROSS REFERENCE TO RELATED APPLICATIONS

This application is based on and claims priority under 35 U.S.C. § 119 to Japanese Patent Application No. JP2022-107108 filed Jul. 1, 2022, the contents of which are incorporated herein in their entirety by reference.

BACKGROUND OF THE INVENTION

This invention relates to a connector, particularly, to a connector having a structure in which an electric wire and a terminal are connected to each other by moving a locator.

JP 2006-236855 A (Patent Document 1) discloses a connector for insulation displacement connection (IDC).

Referring to FIG. 20, a connector 90 of Patent Document 1 is provided with an electric wire holding block (or a locator) 92 and a contact block (or a housing) 94. The contact block 94 holds IDC terminals (not shown) which protrude in a receiving portion (not shown) for receiving an electric wire holding block 92. The electric wire holding block 92 is formed with holding apertures (not shown) for respectively holding electric wires 96 and receiving grooves (not shown) for respectively receiving the IDC terminals.

As shown in FIG. 20, the electric wire holding block 92 is provided with temporal stop protruding portions 921 and projections 923. The electric wire holding block 92 can be held at a temporal stop position of the contact block 94 by use of the temporal stop protruding portions 921. The electric wire holding block 92 can be also held at a pushed position of the contact block 94 by use of the projections 923.

As understood from FIG. 20, in a state that the electric wire holding block 92 is held at the temporal stop position of the contact block 94, end portions of the electric wires 96 can be respectively inserted into the holding apertures (not shown) of the electric wire holding block 92. When the electric wire holding block 92 is pushed into the receiving portion (not shown) of the contact block 94 from the above-mentioned state, the IDC terminals (not shown) and the electric wires 96 are electrically connected to one another. In addition, the electric wire holding block 92 is held at the pushed position of the contact block 94 by functions of the projections 923.

In the connector 90 of Patent Document 1, it is difficult to check whether the electric wire holding block 92 is positioned at the pushed position of the contact block 94. Accordingly, in the connector 90 of Patent Document 1, sometimes the electric wires 96 comes off from the IDC terminals when the connector 90 is used.

SUMMARY OF THE INVENTION

It is an object of the present invention to provide a connector in which connection reliability is improved by making a position of a locator identifiable.

The present invention can certainly grasp a position of a locator by making it possible to see a protruding portion provided to the locator through a first aperture and a second aperture. The present invention also ensures strength by providing the first aperture and the second aperture in a metal shell.

In detail, one aspect of the present invention provides a connector which is attachable to an electric wire. The connector is mateable with a mating connector provided with a mating terminal. The connector comprises a housing, at least one terminal, a shell and a locator. The terminal is held by the housing. The terminal has a contact portion which is brought into contact with the mating terminal when the connector is mated with the mating connector and a connection portion to be connected to the electric wire. The shell is made of metal and has two side wall portions which are located apart from each other in a width direction. Each of the side wall portions is provided with a first aperture and a second aperture. The first aperture and the second aperture pierce the side wall portion in the width direction and are located apart from each other in a first direction perpendicular to the width direction. The locator is attached to the shell so that the locator is movable from a first position to a second position in the first direction. The locator is provided with a first end face, a second end face, a receiving aperture, an admitting portion and two protruding portions. The first end face and the second end face are located on both ends of the locator in a second direction which is perpendicular to the width direction and intersects with the first direction. The receiving aperture pierces the locator from the second end face to the first end face and is receivable an end of the electric wire. The admitting portion communicates with the receiving aperture and allows the connection portion to be moved therein when the locator is moved. The protruding portions correspond to the side wall portions, respectively. Each of the protruding portions protrudes outward in the width direction. When the locator is positioned at the first position, each of the protruding portions is positioned in the first aperture of the side wall portion corresponding thereto. When the locator is positioned at the second position, each of the protruding portions is positioned in the second aperture of the side wall portion corresponding thereto while the connection portion is positioned in the receiving aperture in part.

Another aspect of the present invention provides a connector attached electric wire which comprises the connector as mentioned above. The connector is attached to the electric wire.

In the connector of one aspect of the present invention, the locator is attached to the shell so that the locator is moveable from the first position to the second position. The shell is made of metal, and each of the side wall portions is provided with a first aperture and a second aperture which pierce therethrough in the width direction. The locator is provided with the protruding portions protruding outward in the width direction. When the locator is positioned at the first position, each of the protruding portions is positioned in the first aperture of the side wall portion corresponding thereto. When the locator is positioned at the second position, each of the protruding portions is positioned in the second aperture of the side wall portion corresponding thereto. Since the shell is made of metal, it has predetermined strength even in a state the first aperture and the second aperture are provided therein. Since the first aperture and the second aperture pierce the side wall portion corresponding thereto, the protruding portions of the locator are visible. Accordingly, the position of the locator can be grasped.

An appreciation of the objectives of the present invention and a more complete understanding of its structure may be had by studying the following description of the preferred embodiment and by referring to the accompanying drawings.

Figure 1:
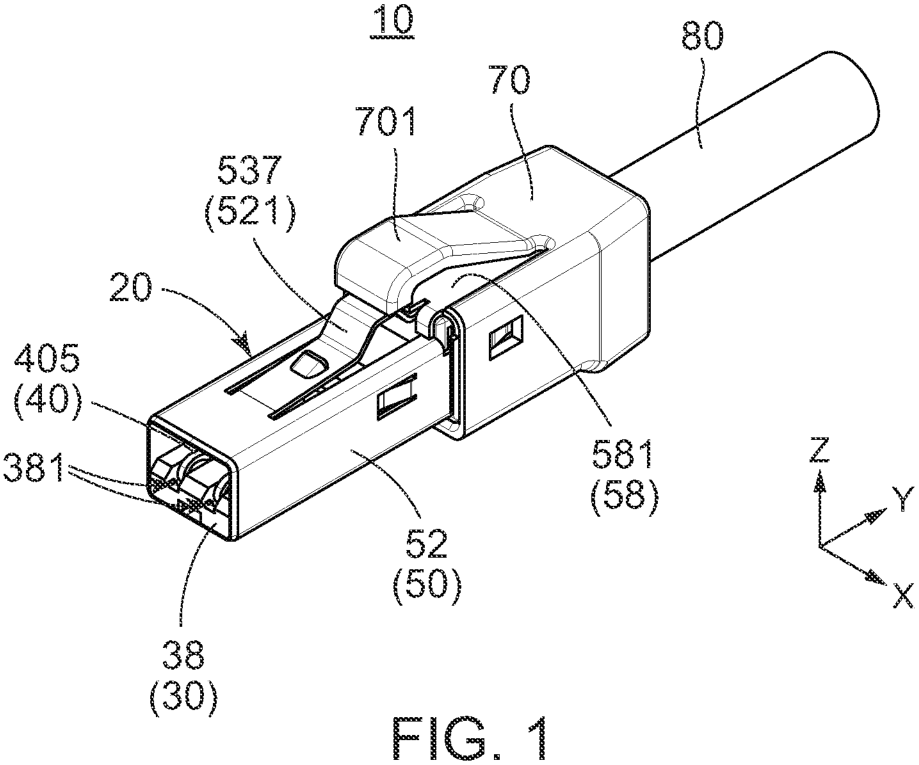
FIG. 1 is a perspective view showing a connector attached electric wire according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Referring to FIG. 1, a connector attached electric wire 10 according to one embodiment of the present invention has a connector 20 and a cable 80. In the present embodiment, the cable 80 has two insulated wires 82 (electric wires: see FIG. 4), and the connector 20 is attached to one ends of the insulated wires 82. However, the present invention is not limited thereto. The connector 20 may be a connector to be connected to at least one electric wire.

The connector 20 shown in FIG. 1 is mateable with and detachable from a mating connector (not shown), which is provided with mating terminals (not shown), in a front-rear direction. In the present embodiment, the front-rear direction is a Y-direction. A negative Y-direction is directed forward while a positive Y-direction is directed rearward. Moreover, in the present embodiment, the connector 20 is a plug connector for Single Pair Ethernet. However, the present invention is not limited thereto. The present invention is also applicable to any connector other than the connector for Single Pair Ethernet. In addition, the present invention is applicable to any connector, such as an inter-connector, other than the plug connector.

Figure 2:
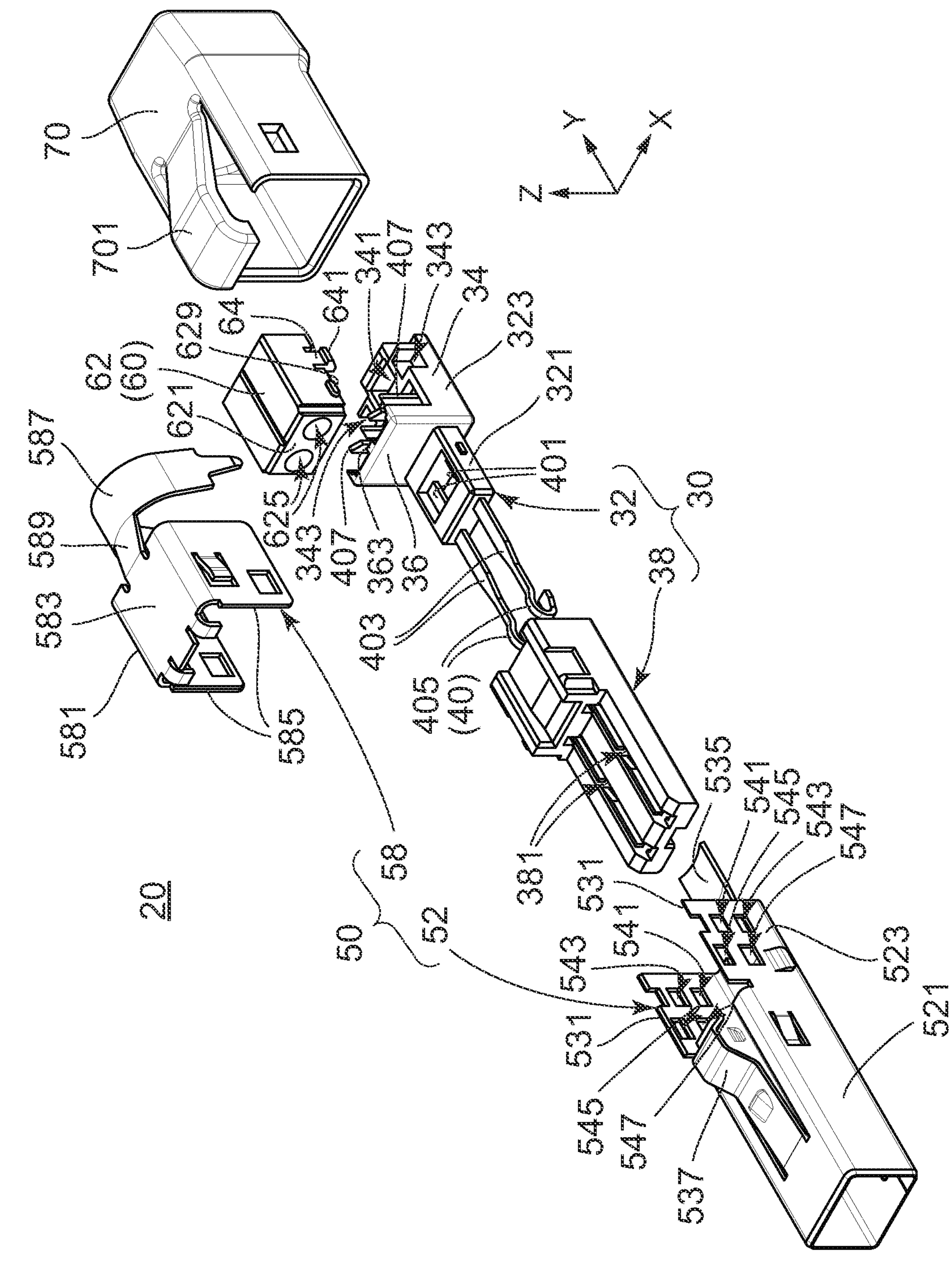
FIG. 2 is an exploded, perspective view showing the connector included in the connector attached electric wire of FIG. 1.
Figure 3:
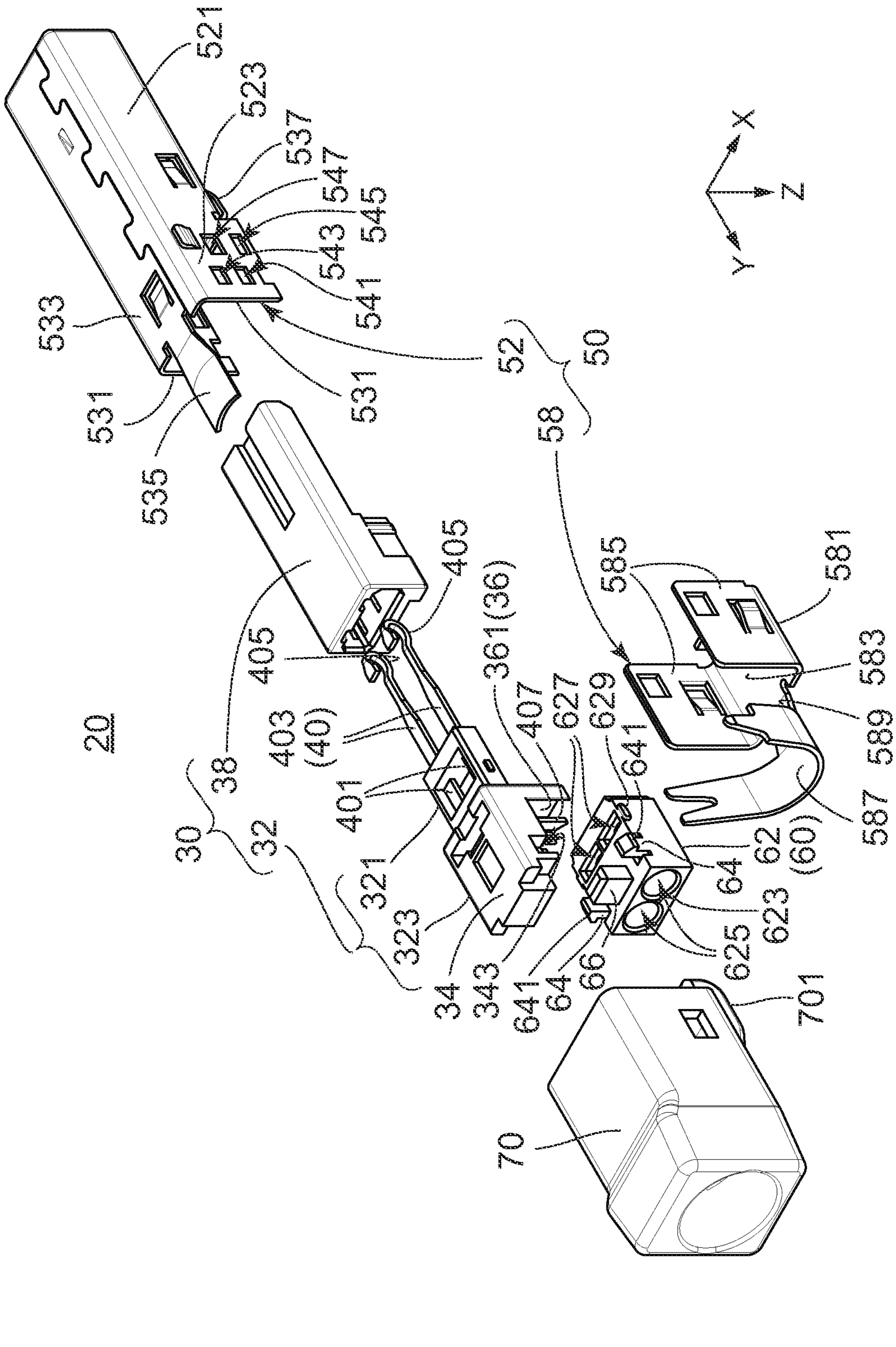
FIG. 3 is another exploded, perspective view showing the connector of FIG. 2.

Referring to FIGS. 2 and 3, the connector 20 is provided with a housing 30, at least one terminal 40, a shell 50, a locator 60 and a hood 70. In the present embodiment, the housing 30 consists of a first housing 32 and a second housing 38. Moreover, in the present embodiment, the at least one terminal 40 is two in number. Furthermore, in the present embodiment, the shell 50 consists of a first shell 52 and a second shell 58. However, the present invention is not limited thereto. The housing 30 may consist of a single member. The at least one terminal 40 may be one or three or more in number. The shell 50 may consist of a single member. The hood 70 is not essential in the present invention.

As shown in FIGS. 2 and 3, the terminals 40 are arranged in a width direction perpendicular to the front-rear direction. In the present embodiment, the width direction is an X-direction. Each of the terminals 40 is formed of a single metal sheet and has a held portion 401, a supporting portion 403, a contact portion 405 and a connection portion 407. However, the present invention is not limited thereto. Each of the terminals 40 is not particularly limited in shape, provided that it has the contact portion 405 and the connection portion 407, wherein the contact portion 405 is brought into contact with the mating terminal (not shown) when the connector 20 is mated with the mating connector (not shown), and wherein the connection portion 407 is connected to the insulated wire 82. For example, the terminal 40 may be a terminal of a compression type.

As understood from FIGS. 2 and 3, the held portion 401 of the terminal 40 is held by the housing 30 at least in part. In the present embodiment, the held portion 401 is held by the first housing 32 in part.

As shown in FIGS. 2 and 3, the supporting portion 403 of the terminal 40 extends forward in the front-rear direction from the held portion 401. The supporting portion 403 supports the contact portion 405. In the present embodiment, the contact portion 405 is a part of a surface of the supporting portion 403. The supporting portion 403 is resiliently deformable. By resilient deformation of the supporting portion 403, the contact portion 405 is movable in at least an up-down direction perpendicular to both the front-rear direction and the width direction. In the present embodiment, the up-down direction is a Z-direction. A positive Z-direction is directed upward while a negative Z-direction is directed downward.

As understood from FIGS. 2 and 3, the connection portion 407 of the terminal 40 extends from the held portion 401 in a first direction perpendicular to the width direction. Here, the first direction is a movable direction of the locator 60 as mentioned later. In the present embodiment, the first direction is identical with the up-down direction. However, the present invention is not limited thereto. Provided that after-mentioned movement of the locator 60 is allowed, the first direction may be tilted with respect to the up-down direction.

As understood from FIGS. 2 and 3, in the present embodiment, the connection portion 407 of the terminal 40 is an insulation displacement connection piece having a forked shape. However, the present invention is not limited thereto. The connection portion 407 may be a piercing piece with which the insulated wire 82 is pierced.

As understood from FIGS. 2 and 3, the first housing 32 has a front portion 321 and a rear portion 323. The rear portion 323 has a base portion 34 and a front wall 36. The front wall 36 extends upward from a front-end portion of the base portion 34. The front portion 321 protrudes forward from the base portion 34. The supporting portions 403 of the terminals 40 extend forward from the front portion 321. The base portion 34 is provided with a guide portion 341 and two recesses 343. The guide portion 341 is a hole which is opened upward and has a bottom. The guide portion 341 receives and guides an after-mentioned guided portion 66 of the locator 60. The recesses 343 are located outward of the guide portion 341 in the width direction. Each of the recesses 343 is opened upward and outward in the width direction. The recesses 343 receive after-mentioned supporting portions 64 of the locator 60 in part and allow resilient deformation of the supporting portions 64. The connection portions 407 of the terminals 40 are located between the front wall 36 and the guide portion 341 in the front-rear direction. In the present embodiment, the first housing 32 is made of insulating resin and integrally molded with the terminals 40. However, the present invention is not limited thereto. The terminals 40 may be held by the first housing 32 in any other way, such as press-fitting.

As understood from FIGS. 2 and 3, the second housing 38 is attached to the first housing 32 and forms the housing 30 together with the first housing 32. The second housing 38 is made of insulating resin which is same as or different from that of the first housing 32. The second housing 38 accommodates the front portion 321 of the first housing 32 therein when attached to the first housing 32. The second housing 38 is provided with accommodating grooves 381 which accommodate the supporting portions 403 of the terminals 40, respectively, at least in part. When the second housing 38 is attached to the first housing 32, the contact portions 405 of the terminals are located outward of the accommodating grooves 381 of the second housing 38. In the present embodiment, the contact portion 405 of each of the terminals 40 is a part of the surface of the supporting portion 403 of the terminal 40 and oriented upward. With this structure, the contact portion 405 of the terminal 40 is contactable with the mating terminal (not shown) provided to the mating connector when the connector 20 is mated with the mating connector (not shown).

As shown in FIGS. 2 and 3, the first shell 52 has a front portion 521 and a rear portion 523. The front portion 521 has a generally square tube shape long in the front-rear direction. The front portion 521 is provided with a locking arm 537 on a side of an upper surface thereof.

As shown in FIGS. 2 and 3, the rear portion 523 of the first shell 52 is opened upward. In detail, the rear portion 523 of the first shell 52 has two side wall portions 531 which are located apart from each other in the width direction and a bottom portion 533 which couples the side wall portions 531 to each other. The bottom portion 533 is provided with an electric wire supporting portion 535 extending rearward in the front-rear direction. The first shell 52 is made of metal. In the present embodiment, the first shell 52 is made by use of a single metal sheet. By use of the metal sheet, the shell 52 can obtain necessary and sufficient strength.

As shown in FIGS. 2 and 3, each of the side wall portions 531 of the first shell 52 is provided with a first aperture 541, a second aperture 543, a third aperture 545 and a fourth aperture 547. However, the third aperture 545 and the fourth aperture 547 are not essential in the present invention. In detail, when supplementary protruding portions 629 mentioned later do not exist, the third aperture 545 and the fourth aperture 547 are not essential.

Figure 11:
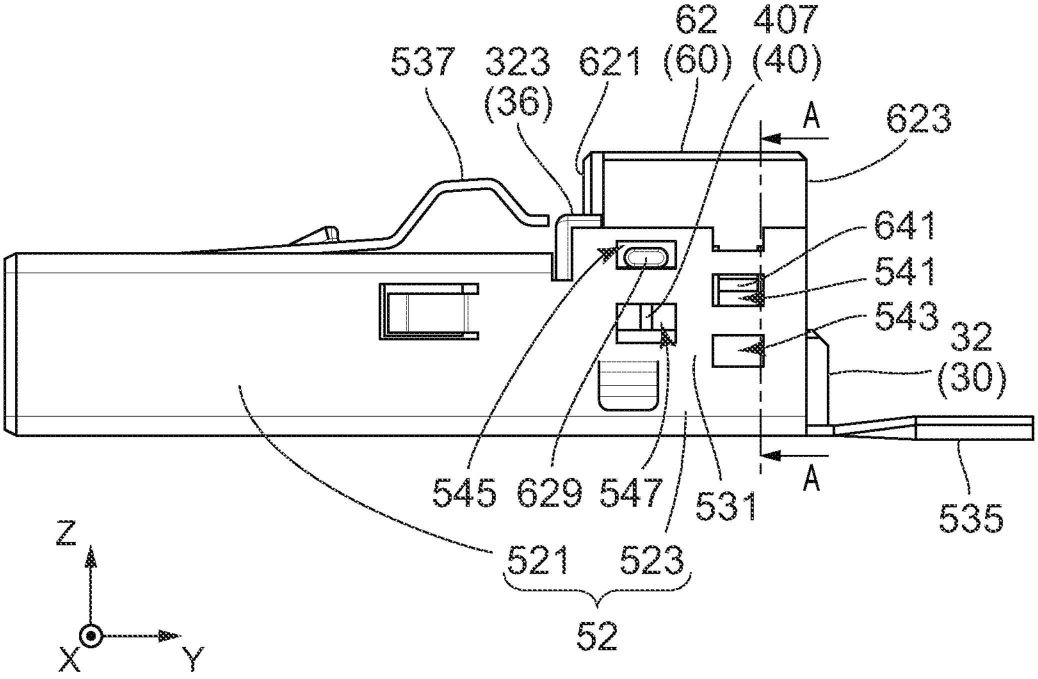
FIG. 11 is a side view showing the main portion of the connector of FIG. 4. The locator is positioned at the first position.
Figure 13:
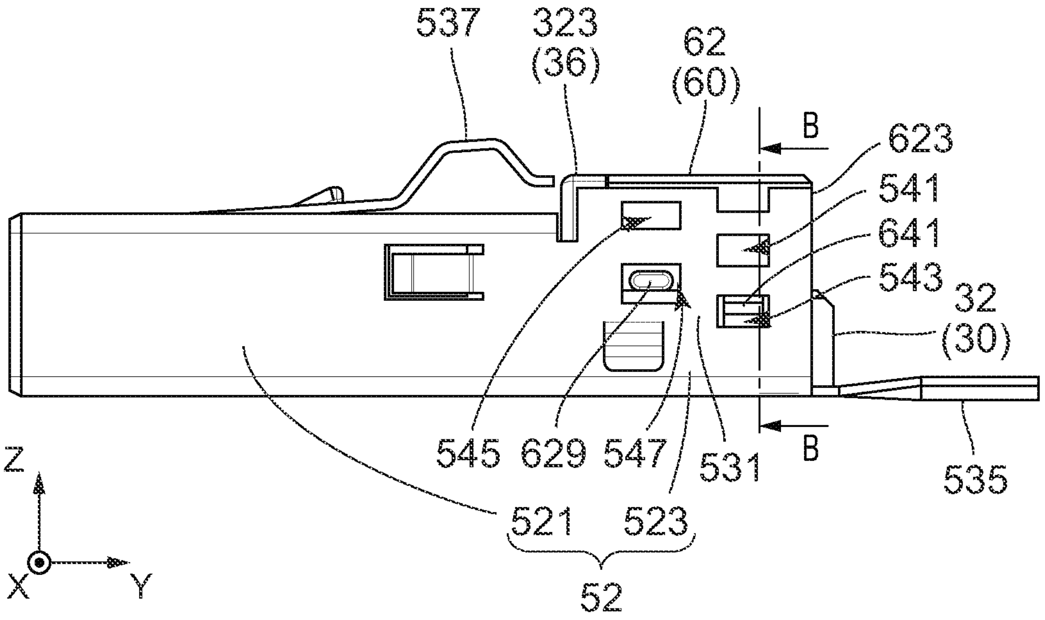
FIG. 13 is another side view showing the main portion of the connector of FIG. 4. The locator is positioned at the second position.

Referring to FIGS. 11 and 13 in addition to FIGS. 2 and 3, the first aperture 541, the second aperture 543, the third aperture 545 and the fourth aperture 547 pierce the side wall portion 531 in which they are formed in the width direction. The first aperture 541 and the second aperture 543 are apart from each other in the first direction. In the present embodiment, the first aperture 541 and the second aperture 543 are apart from each other in the up-down direction. Similarly, the third aperture 545 and the fourth aperture 547 are apart from each other in the first direction.

As shown in FIGS. 11 and 13, the first aperture 541 and the third aperture 545 are located apart from each other in a second direction which is perpendicular to the width direction and intersects with the first direction. In the present embodiment, the second direction is the front-rear direction. In the present embodiment, the first aperture 541 and the third aperture 545 are apart from each other in the front-rear direction and in the up-down direction. Similarly, the second aperture 543 and the fourth aperture 547 are apart from each other in the second direction. In the present embodiment, the second aperture 543 and the fourth aperture 547 are apart from each other in the front-rear direction and in the up-down direction. Additionally, as shown in FIG. 11, the third aperture 545 and the fourth aperture 547 overlap with the connection portion 407 of the terminal 40 in the second direction. This is for expanding a distance between the connection portion 407 and the side wall portion 531 as much as possible.

Figure 4:
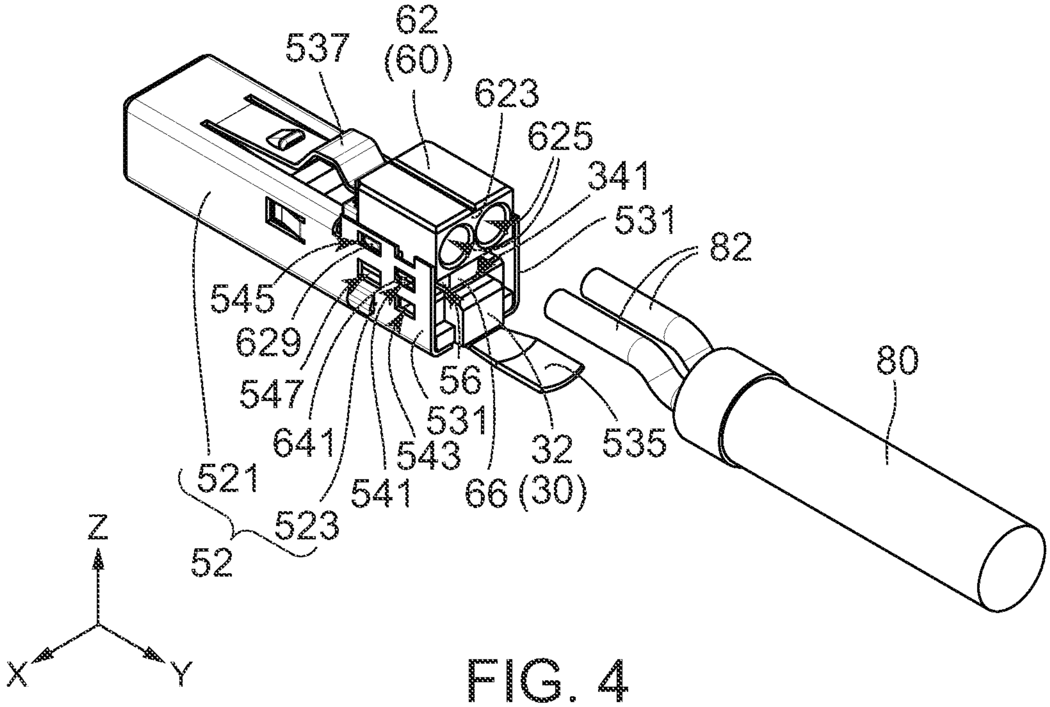
FIG. 4 is a perspective view showing a main portion of the connector included in the connector attached electric wire of FIG. 1 and insulated wires. In the main portion of the connector, a locator is positioned at a first position. The main portion of the connector and the insulated wires are separated from each other.

As understood from FIG. 4, the first shell 52 accommodates almost the whole of the housing 30 therein. The side wall portions 531 of the first shell 52 extend so that they almost reach a rear end of the first housing 32 in the front-rear direction. Moreover, the side wall portions 531 of the first shell 52 extend so that they almost reach an upper end of the front wall 36 of the first housing 32 (see FIG. 6) in the up-down direction. Thus, a space sandwiched between the side wall portions 531 of the first shell 52 is formed behind the front wall 36 of the first housing 32. The space forms an accommodation portion 56 for accommodating the locator 60. In detail, referring to FIG. 15 in addition to FIG. 4, the front wall 36 of the first housing 32 has a receiving surface 361 intersecting with the second direction. The receiving surface 361 and the side wall portions 531 of the first shell 52 form the accommodation portion 56 for accommodating the locator 60.

Figure 9:
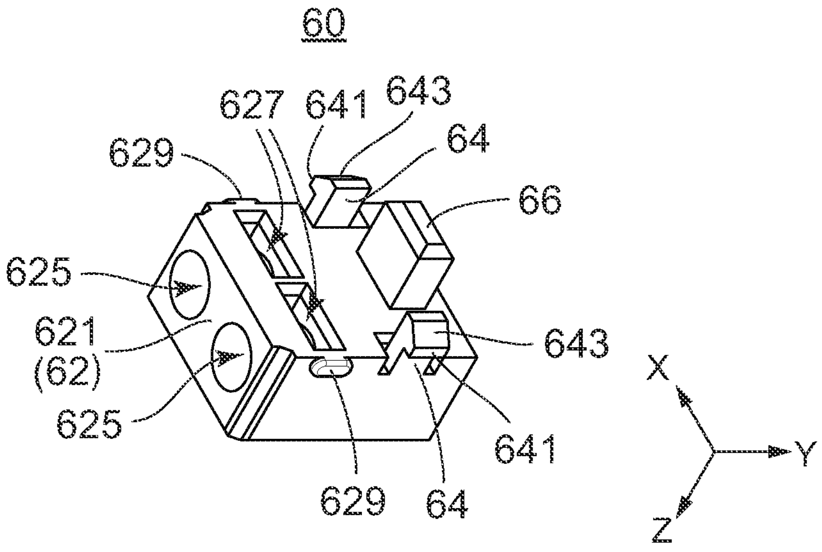
FIG. 9 is a perspective view showing the locator included in the connector of FIG. 3.
Figure 10:
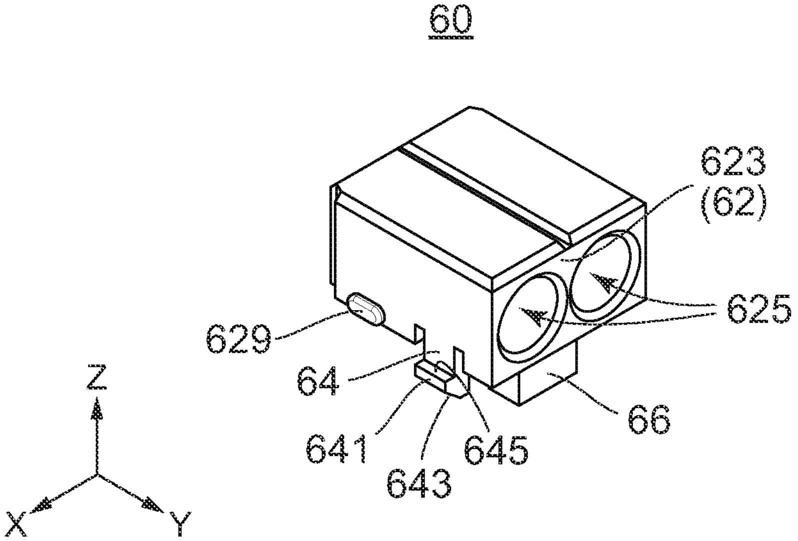
FIG. 10 is another perspective view showing the locator of FIG. 9.

As shown in FIGS. 9 and 10, the locator 60 has a main portion 62 having an almost rectangular parallelepiped shape, the supporting portions 64 and the guided portion 66. The locator 60 is formed from insulating resin. The supporting portions 64 are located on both ends of the main portion 62 in the width direction and extend in the first direction from the main portion 62. The guided portion 66 extends in the first direction from a lower surface of the main portion 62. In the present embodiment, each of the supporting portions 64 and the guided portion 66 extends downward. The locator 60 is provided with a first end face 621, a second end face 623, two receiving apertures 625, two admitting portions 627, two protruding portions 641 and two supplementary protruding portions 629. The first end face 621, the second end face 623, the receiving apertures 625, the admitting portions 627 and the supplementary protruding portions 629 are provided to the main portion 62 of the locator 60. The protruding portions 641 are provided to the supporting portions 64 of the locator 60, respectively. In other words, the supporting portions 64 of the locator 60 correspond to and support the protruding portions 641, respectively. However, the present invention is not limited thereto. Each of the number of the receiving apertures 625 and the number of the admitting portions 627 depends on the number of the terminals 40. Moreover, the supplementary protruding portions 629 are not essential in the present invention.

As understood from FIGS. 9 and 10, the first end face 621 and the second end face 623 of the locator 60 are located on both ends of the locator 60 in the second direction. In the present embodiment, the first end face 621 and the second end face 623 are located at a front end and a rear end of the main portion 62 of the locator 60, respectively.

Figure 5:
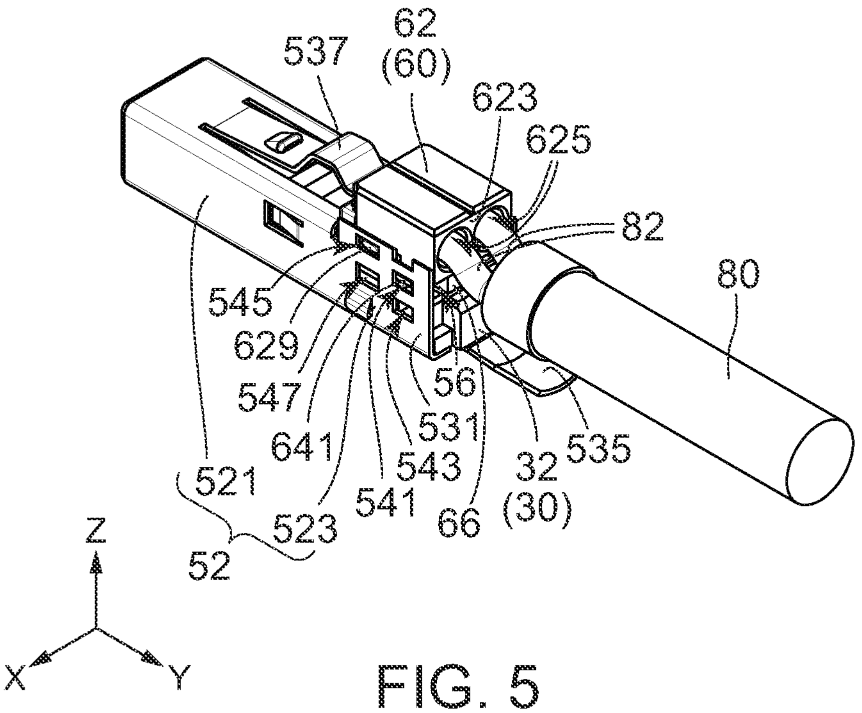
FIG. 5 is a perspective view showing the main portion of the connector and the insulated wires of FIG. 4. In the main portion of the connector, the locator is positioned at the first position. The insulated wires are inserted into receiving apertures of the locator in part.

As understood from FIGS. 9, 10, 12 and 14, the receiving apertures 625 of the locator 60 pierce the main portion 62 from the second end face 623 to the first end face 621. Moreover, as understood from FIGS. 4 and 5, each of the receiving apertures 625 has an internal diameter which can receive an end of the insulated wire 82. In the present embodiment, each of the receiving apertures 625 has a round shape when viewed in the front-rear direction. However, the present invention is not limited thereto. The shape of the receiving aperture 625 may be any shape other than the round shape, such as an elliptic shape, an oval shape or a polygonal shape. Moreover, the shape and the size of the receiving aperture 625 in the first end face 621 may be different from the shape and the size of the receiving aperture 625 in the second end face 623, respectively. For example, the size of the receiving aperture 625 in the second end face 623 may be larger than the size of the receiving aperture 625 in the first end face 621. Furthermore, the receiving apertures 625 may communicate with each other in a plane perpendicular to the front-rear direction.

As understood from FIG. 9, the admitting portions 627 of the locator 60 correspond to the receiving apertures 625, respectively. Moreover, as understood from FIG. 3, the admitting portions 627 correspond to the connection portions 407 of the terminals 40, respectively. Each of the admitting portions 627 is opened downward and communicates with the receiving aperture 625 corresponding thereto. The admitting portion 627 has a size which can receive the connection portion 407 and which allows movement of the locator 60 therein.

As understood from FIGS. 9 and 10, each of the protruding portions 641 of the locator 60 is supported by the supporting portion 64 corresponding thereto and protrudes outward in the width direction. The supporting portion 64 is resiliently deformable, and the protruding portion 641 is movable at least in the width direction because of resilient deformation of the supporting portion 64. The protruding portion 641 has an inclined surface 643 and an upper surface 645. In the present embodiment, the inclined surface 643 is a surface parallel to the front-rear direction and intersecting with the up-down direction. The inclined surface 643 is oriented downward in the up-down direction and outward in the width direction. Moreover, in the present embodiment, the upper surface 645 is a surface perpendicular to the up-down direction. The upper surface 645 is oriented upward. However, the present invention is not limited thereto. The upper surface 645 of the protruding portion 641 may intersect obliquely with the up-down direction to some extent.

Figure 12:
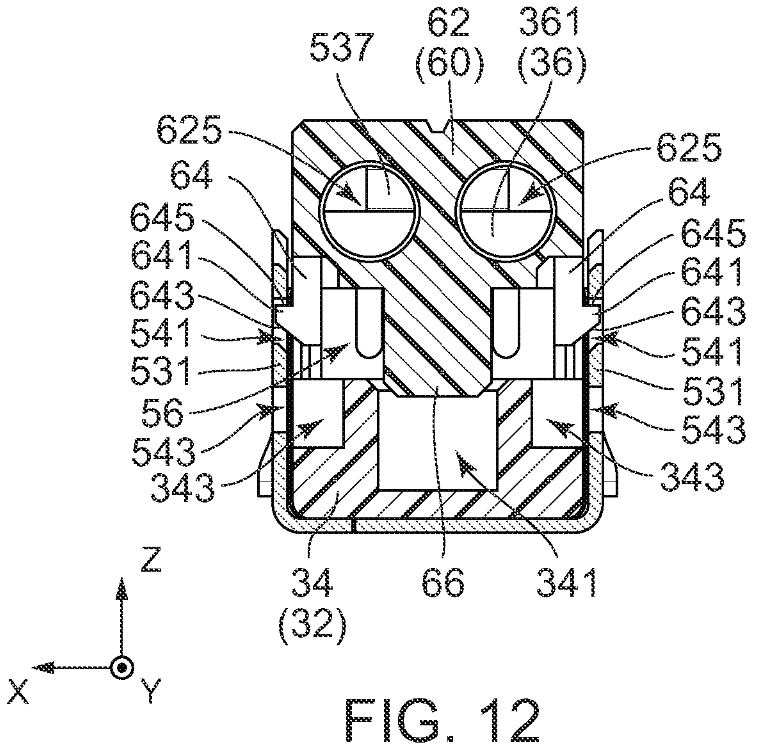
FIG. 12 is a cross-sectional view showing the main portion of the connector of FIG. 11, taken along A-A line.
Figure 14:
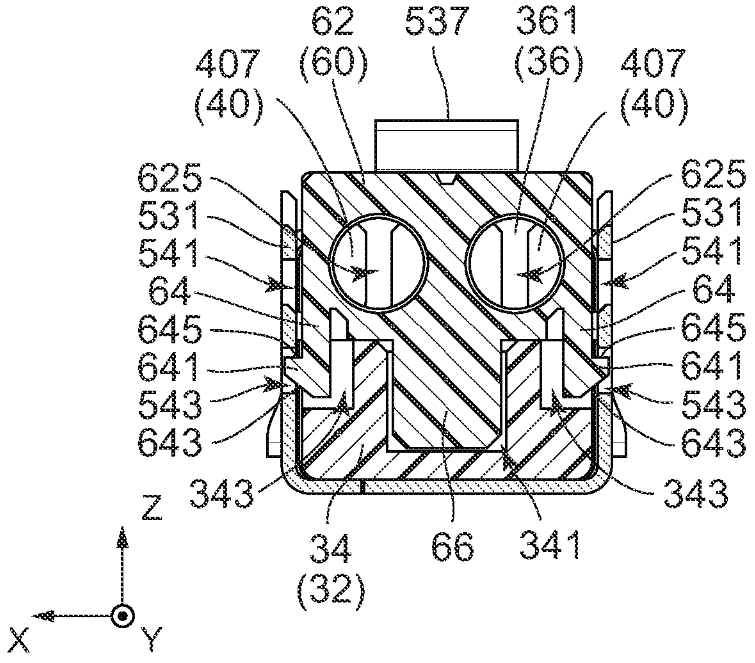
FIG. 14 is a cross-sectional view showing the main portion of the connector of FIG. 13, taken along B-B line.

As understood from FIGS. 12 and 14, a size of the inclined surface 643 of the protruding portion 641 is larger than a size of the side wall portion 531 of the shell 50 in the width direction. With this structure, when the locator 60 is moved from a first position to a second position, the protruding portions 641 are easy to go out from the first apertures 541. On the other hand, a size of the upper surface 645 is equal to or slightly larger than the size of the side wall portion 531 of the shell 50. With this structure, if the locator 60 receives an upward force, the protruding portions 641 are hard to go out from the first apertures 541 when they are positioned in the first apertures 541, and they are hard to go out from the second apertures 543 when they are positioned in the second apertures 543.

As understood from FIGS. 9 and 10, the supplementary protruding portions 629 protrude outward in the width direction from side surfaces of the main portion 62. Moreover, the supplementary protruding portions 629 are located apart from the protruding portions 641 in the second direction. In the present embodiment, the supplementary protruding portions 629 are located forward of the protruding portions 641 in the front-rear direction. In the present embodiment, the supplementary protruding portions 629 are located upward of the protruding portions 641 in the up-down direction. The protruding portions 641 mainly work to maintain a position of the locator 60 in the first direction, and the supplementary protruding portions 629 mainly work to keep an orientation of the locator 60. In the present embodiment, a size of each of the supplementary protruding portions 629 is smaller than a size of each of the protruding portions 641. Particularly in the width direction, a protruding amount of the supplementary protruding portion 629 is less than that of the protruding portion 641.

As shown in FIGS. 4 to 8, the locator 60 is attached to the shell 50. In detail, the locator 60 is attached to the first shell 52 so that it is movable from the first position (FIGS. 4 to 7) to the second position (FIG. 8) in the first direction. As understood from FIGS. 11 to 14, the locator 60 attached to the shell 50 is, at least in part, located in the accommodation portion 56 which is formed by the receiving surface 361 of the first housing 32 and the side wall portions 531 of the shell 50. However, this shall not apply to the protruding portions 641 and the supplementary protruding portions 629.

Moreover, the guided portion 66 of the locator 60 is, at least in part, located in the guide portion 341 of the first housing 32. Furthermore, the connection portion 407 of each of the terminals 40 is, at least in part, located in the admitting portion 627 corresponding thereto (see FIG. 9).

As understood from FIGS. 4 to 8, the protruding portions 641 of the locator 60 correspond to the side wall portions 531 of the shell 50, respectively. The supplementary protruding portions 629 also correspond to the side wall portions 531 of the shell 50, respectively.

As shown in FIGS. 11 and 12, when the locator 60 is positioned at the first position, each of the protruding portions 641 is positioned in the first aperture 541 of the side wall portion 531 corresponding thereto. In addition, each of the supplementary protruding portions 629 is positioned in the third aperture 545 of the side wall portion 531 corresponding thereto.

As understood from FIG. 12, when the locator 60 is positioned at the first position, a range occupied by each of the receiving apertures 625 of the locator 60 overlaps with a range occupied by the receiving surface 361 of the first housing 32 in the first direction. On the other hand, a part of the range occupied by the receiving aperture 625 of the locator 60 is located out of the range occupied by the receiving surface 361 of the first housing 32 in the first direction. In other words, when the receiving aperture 625 is viewed from behind, the receiving surface 361 and a state existing forward thereof are visible. In the meantime, in the present embodiment, the connection portion 407 of the terminal 40 is not visible in the receiving aperture 625.

Figure 6:
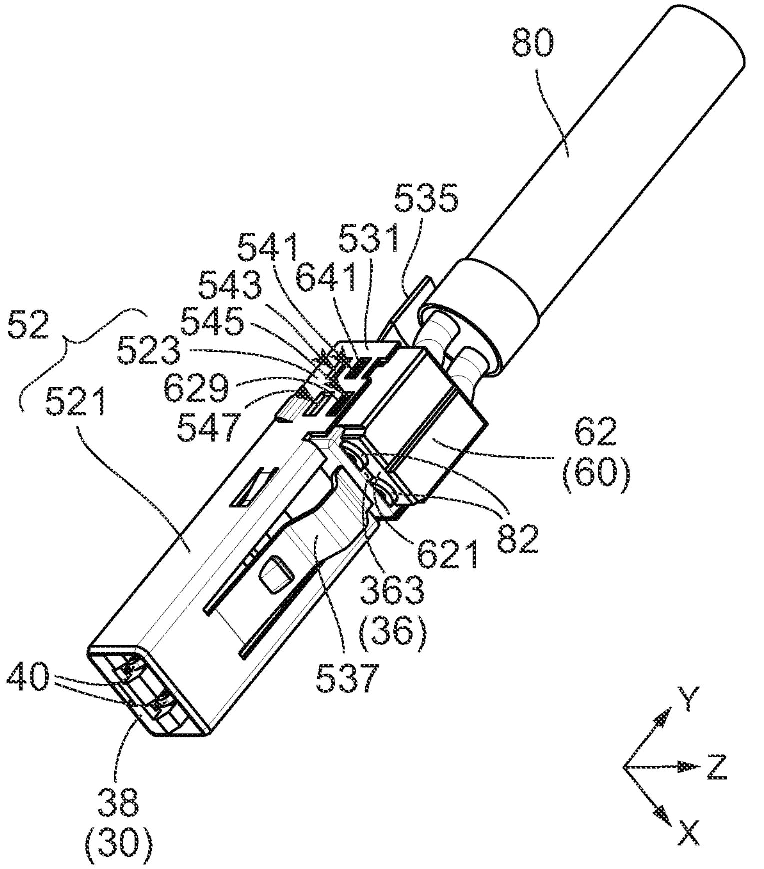
FIG. 6 is another perspective view showing the main portion of the connector and the insulated wires of FIG. 5.

As understood from FIGS. 4 to 7, when the locator 60 is positioned at the first position, the ends of the insulated wires 82 can be inserted into the receiving apertures 625, respectively. As mentioned above, the range occupied by each of the receiving apertures 625 of the locator 60 overlaps with the range occupied by the receiving surface 361 of the first housing 32 in the first direction. Accordingly, the ends of the insulated wires 82 inserted in the receiving apertures 625 can be brought into abutment with the receiving surface 361 of the first housing 32. On the other hand, the part of the range occupied by the receiving aperture 625 of the locator 60 is located out of the range occupied by the receiving surface 361 of the first housing 32. Accordingly, as shown in FIG. 6, the end of the insulated wire 82 is visible from a front or diagonal front thereof. In other words, it can be seen whether the insulated wires 82 are properly arranged with respect to the locator 60 or not.

Figure 7:
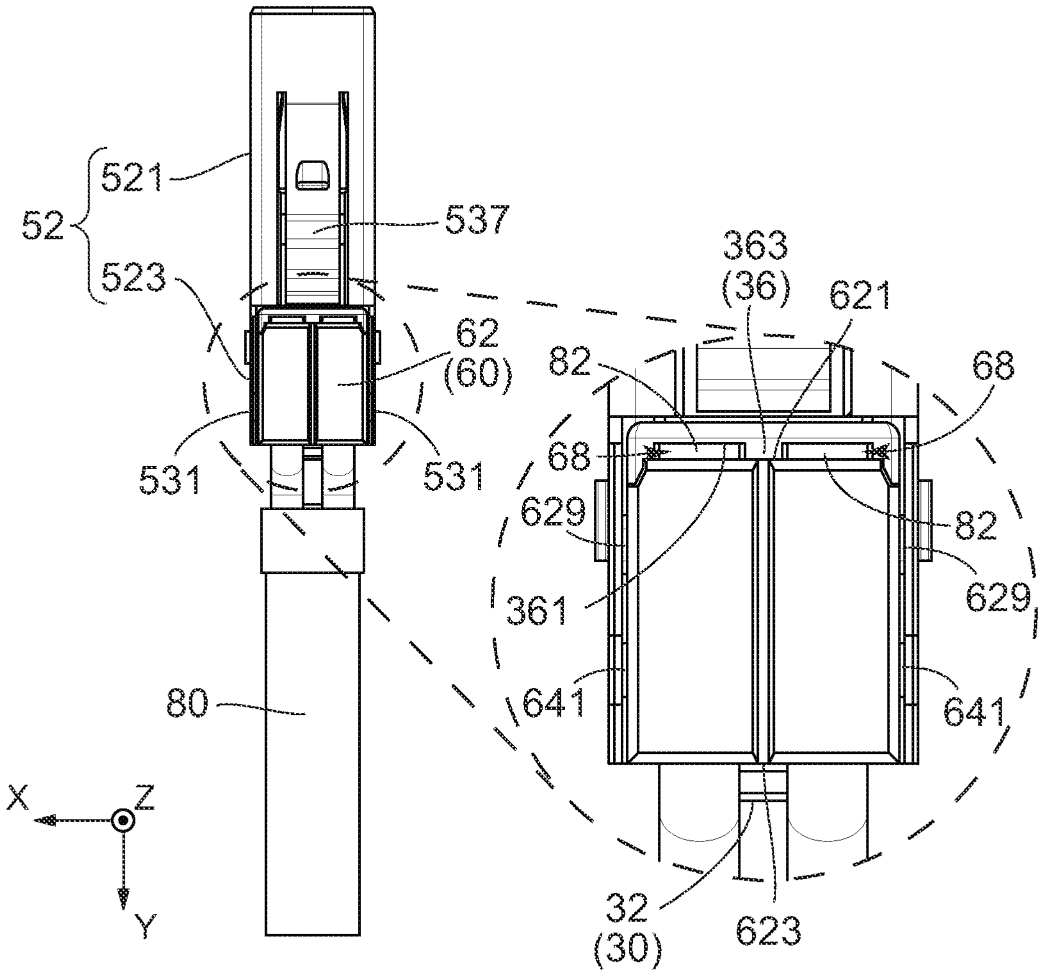
FIG. 7 is a plane view showing the main portion of the connector and the insulated wires of FIG. 5. The locator and the vicinity thereof are shown in expanded fashion.
Figure 8:
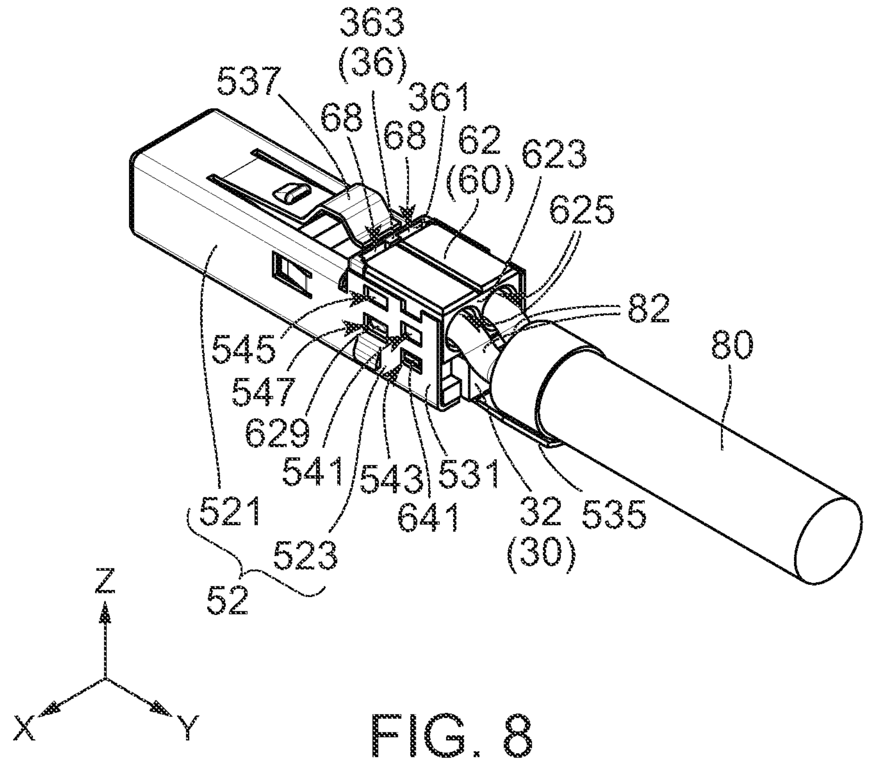
FIG. 8 is yet another perspective view showing the main portion of the connector and the insulated wires of FIG. 5. In the main portion of the connector, the locator is positioned at a second position.

As shown in FIG. 7, in the present embodiment, the first end face 621 of the locator 60 is nearer to the receiving surface 361 of the housing 30 than the second end face 623 of the locator 60 in the second direction. In addition, there is a gap 68 between the first end face 621 of the locator 60 and the receiving surface 361 of the housing 30 in the second direction. In detail, the receiving surface 361 of the first housing 32 is formed with an elongated protrusion 363 which protrudes in the second direction and extends in the first direction, and the elongated protrusion 363 forms the gap 68 between the first end face 621 and the receiving surface 361. Through the gap 68, it can be seen whether the ends of the insulated wires 82 are properly arranged with respect to the locator 60 or not. In addition, the elongated protrusion 363 prevents the ends of the insulated wires 82 from being brought into contact with each other. Thus, the insulated wires 82 are prevented from being shorted to each other.

As understood from FIG. 13, when the locator 60 is positioned at the second position, each of the protruding portions 641 is positioned in the second aperture 543 of the side wall portion 531 corresponding thereto. In addition, each of the supplementary protruding portions 629 is positioned in the fourth aperture 547 of the side wall portion 531 corresponding thereto. Movement of the locator 60 from the first position to the second position is carried out by moving the locator 60 along the first direction. In the present embodiment, pressing down moves the locator 60 from the first position to the second position. When the locator 60 is pressed down, the protruding portions 641 come out from the first apertures 541 and come into the second apertures 543 because of resilient deformation of the supporting portions 64. The supplementary protruding portions 629 come out from the third apertures 545 and come into the fourth apertures 547 because of resilient deformation of at least one of the locator 60 and the first shell 52.

As understood from FIGS. 13 and 14, each of the protruding portions 641 is positioned in the second aperture 543 of the side wall portion 531 corresponding thereto, so that movement of the locator 60 from the second position to the first position is regulated. Moreover, each of the supplementary protruding portions 629 is positioned in the fourth aperture 547 of the side wall portion 531 corresponding thereto, so that inclination of the locator 60 is prevented or suppressed.

As understood from FIG. 14, when the locator 60 is positioned at the second position, a range occupied by each of the receiving aperture 625 is covered by a range occupied by the receiving surface 361 in the first direction. In other words, when the receiving apertures 625 are viewed from behind, the state existing forward of the receiving surface 361 is invisible. Accordingly, when end portions of the insulated wires 82 are properly arranged with respect to the receiving apertures 625, the ends of the insulated wires 82 are covered by the receiving surface 361 or close to and face the receiving surface 361. Thus, the ends of the insulated wires 82 are protected by the front wall 36.

As shown in FIG. 14, when the receiving apertures 625 are viewed from behind in a case the locator 60 is positioned at the second position, the connection portions 407 of the terminals 40 are visible. This means that the connection portions 407 of the terminals 40 are positioned in the receiving apertures 625 in part when the locator 60 is positioned at the second position. In other words, when the locator 60 is moved from the first position to the second position in the state that the end portions of the insulated wires 82 are inserted in the receiving apertures 625, the connection portions 407 are brought into pressure contact with the insulated wires 82, respectively.

Figure 15:
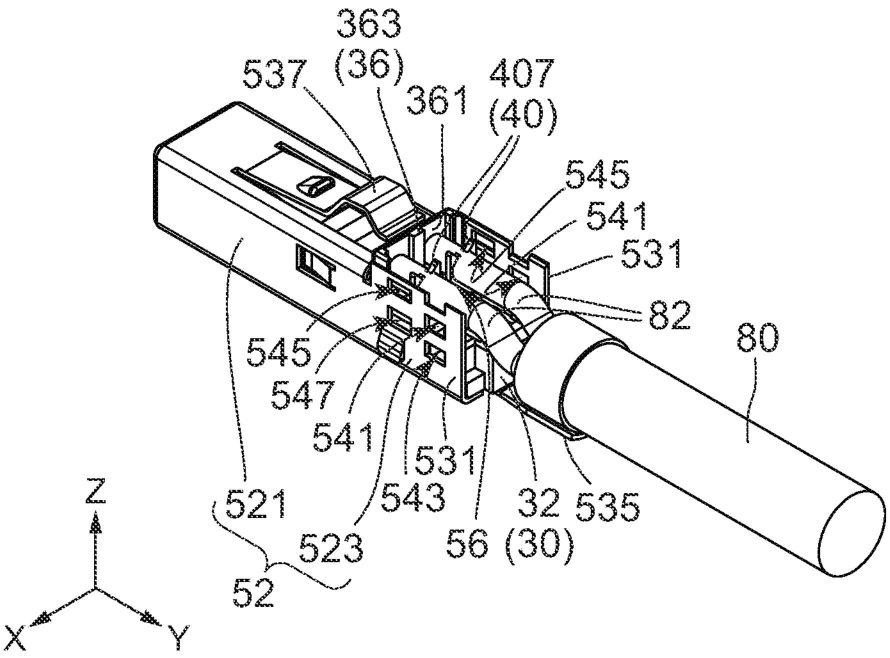
FIG. 15 is a perspective view showing the main portion of the connector and the insulated wires of FIG. 8. The locator is omitted in the figure.
Figure 16:
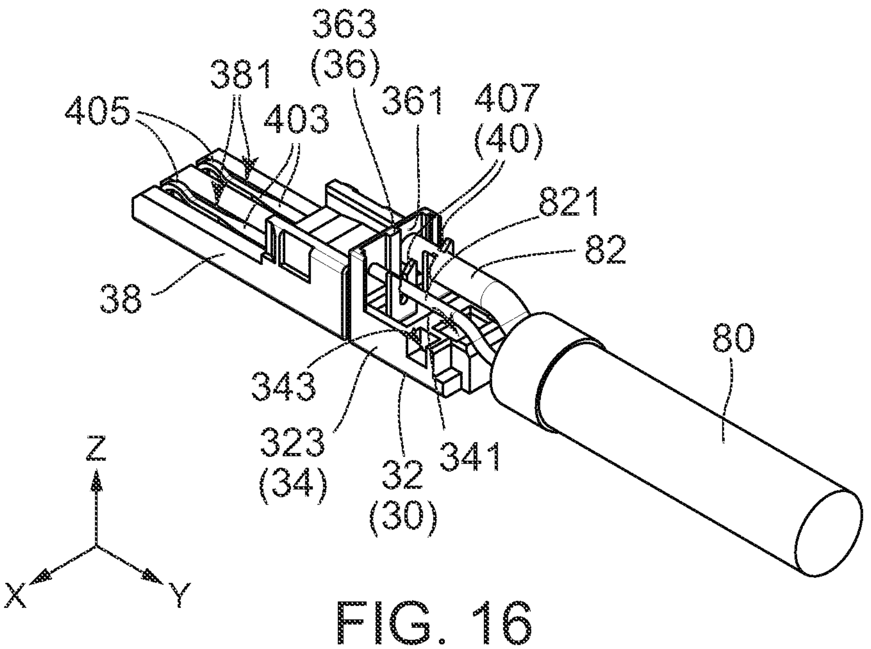
FIG. 16 is another perspective view showing the main portion of the connector and the insulated wires of FIG. 8. The locator and a first shell are omitted in the figure. In one of the insulated wires, an insulating coating thereof is removed in part.

As understood from FIGS. 15 and 16, when the locator 60 is moved from the first position to the second position, the connection portion 407 of each of the terminals 40 cuts an insulation coating of the insulated wire 82 and is brought into contact with a core wire 821. In a case where the connection portion 407 is the insulation displacement connection piece, the insulated wire 82 receives a reaction force from the connection portion 407, and the locator 60 might receive a force directed toward the first position. Even in such a case, the protruding portions 641 and the supplementary protruding portions 629 are positioned in the second apertures 543 and the fourth apertures 547, respectively, as described above with reference to FIG. 13, so that the locator 60 is prevented from being moved from the second position to the first position. Thus, electrical connection between each of the terminals 40 and the insulated wire 82 corresponding thereto is maintained. By seeing that the protruding portions 641 and the supplementary protruding portions 629 are positioned in the second apertures 543 and the fourth apertures 547, respectively, it can be grasped that the locator 60 is positioned at the second position. At the same time, it can be ascertained that the connection portions 407 of the terminals 40 are electrically connected with the insulated wires 82.

Figure 17:
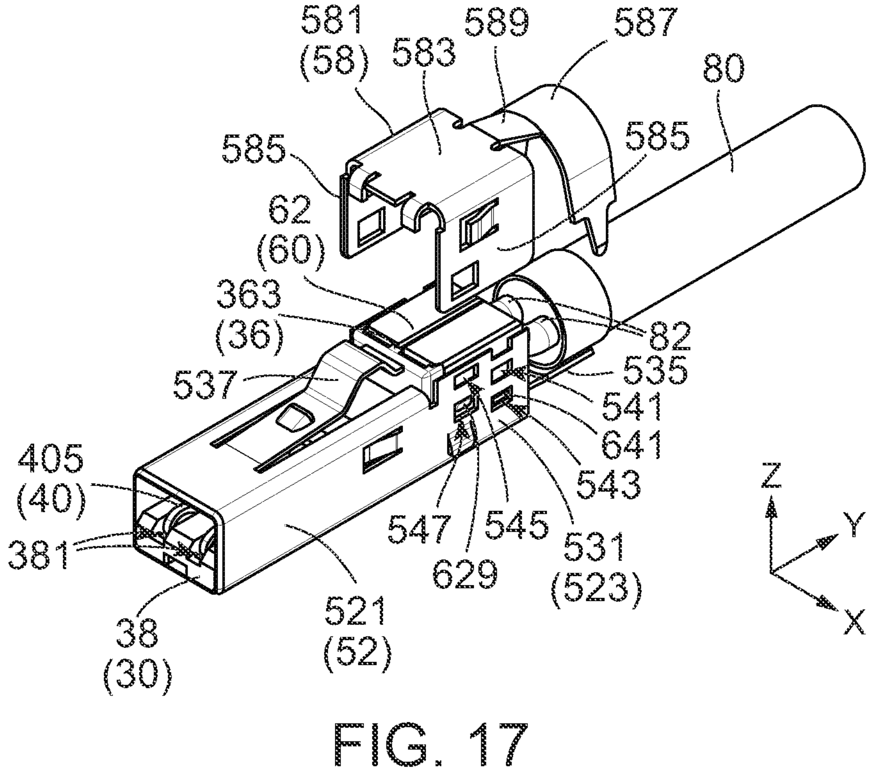
FIG. 17 is another perspective view showing the connector attached electric wire of FIG. 1. A hood is omitted in the figure. A second shell is not yet attached to the first shell.
Figure 18:
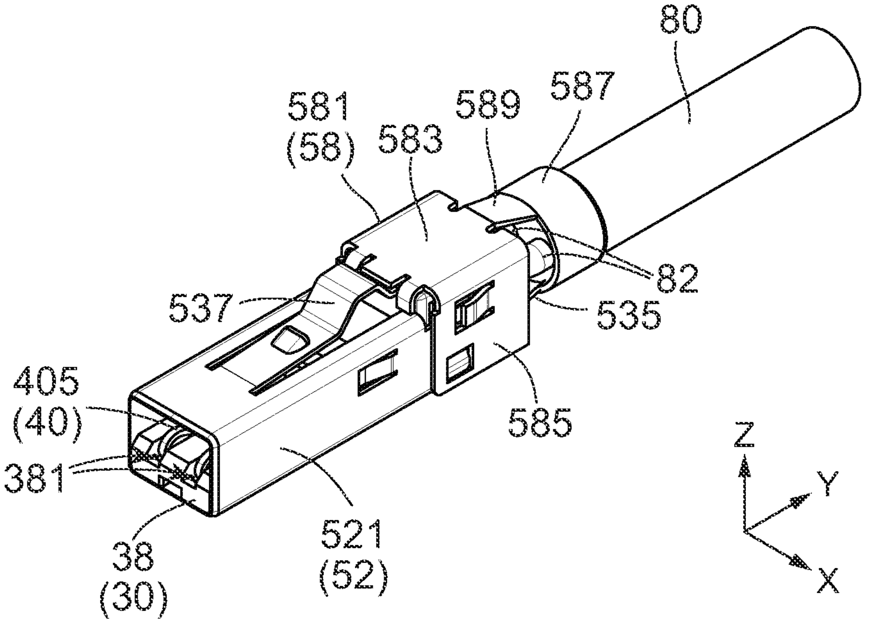
FIG. 18 is a perspective view showing the connector attached electric wire of FIG. 17. The second shell is attached to the first shell.

Referring to FIGS. 17 and 18, the second shell 58 has a cover portion 581 which covers the locator 60 and the rear portion 523 of the first shell 52. The cover portion 581 has a top plate portion 583 and side plate portions 585. In the present embodiment, the second shell 58 is provided with a swaging portion 587 holding the cable 80. The swaging portion 587 is coupled with the cover portion 581 by means of a coupling portion 589 extending rearward in the front-rear direction from the top plate portion 583. The second shell 58 is attached to the first shell 52 and covers the locator from above. The cover portion 581 covers the side wall portions 531 of the first shell 52 from the outside in the width direction. The cover portion 581 is fixed to the side wall portions 531. In order to fix the cover portion 581 to the side wall portions 531, the cover portion 581 is formed with window portions while each of the side wall portions 531 is formed with a cut-and-raised portion in the present embodiment. In addition, the swaging portion 587 is swaged to the cable 80 and the electric wire supporting portion 535 of the first shell 52. Thus, the cable 80 or the insulated wires 82 are held by the swaging portion 587.

Figure 19:
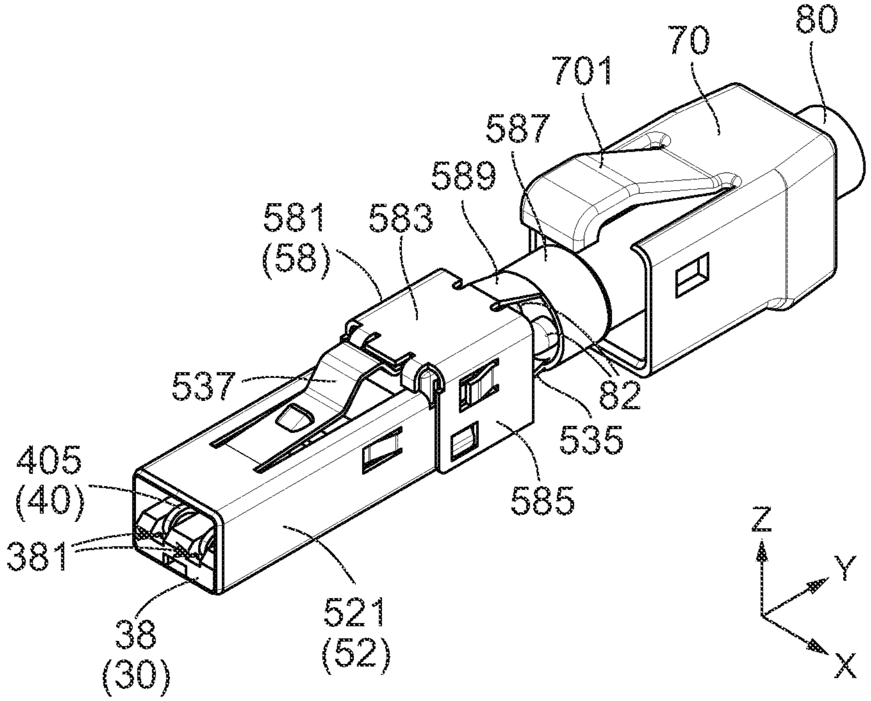
FIG. 19 is yet another perspective view showing the connector attached electric wire of FIG. 1. The hood is not yet attached to the shell.
Figure 20:
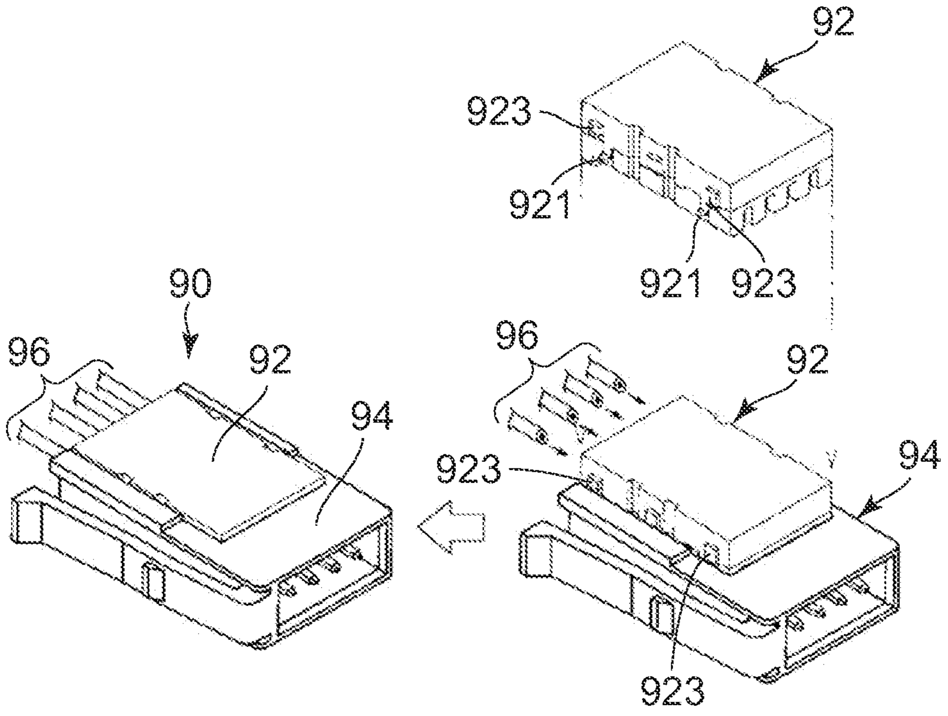
FIG. 20 PRIOR ART
FIG. 20 is a view showing an insulation displacement connection connector disclosed in Patent Document 1.

Referring to FIG. 19, the hood 70 is attached to the cable 80 in advance. The hood 70 is attached to the shell 50 so that it covers the second shell 58 after the second shell 58 is attached to the first shell 52. In order to fix the hood 70 to the shell in the present embodiment, the hood 70 is formed with windows, and each of the side plate portions 585 of the second shell 58 is formed with a cut-and-raised portion. The hood 70 has an operation arm 701. As shown in FIG. 1, the operation arm 701 is positioned above the locking arm 537 in part when it is attached to the shell 50.

As mentioned above, according to the present embodiment, that the locator 60 is positioned at the second position can be checked by seeing that the protruding portions 641 are positioned in the second apertures 543 of the first shell 52 during a manufacturing process of the connector 20. When the locator 60 is positioned at the second position, it can be judged that the insulated wires 82 are properly connected to the connection portions 407 of the terminals 40, and high connection reliability can be achieved. Moreover, the first shell 52 is made of metal, so that it has necessary and sufficient strength even if the third aperture 545 and the fourth aperture 547 are formed in each of the side wall portions 531 in addition to the first aperture 541 and the second aperture 543.

Although the specific explanation about the present invention is made above with reference to concrete embodiments, the present invention is not limited thereto but susceptible of various modifications and alternative forms without departing from the spirit of the invention.

For example, although the first position of the locator 60 is located upward of the second position in the up-down direction in the aforementioned embodiment, the first position of the locator 60 may be located downward of the second position. In that case, the rear portion 523 of the first shell 52 is opened downward, and the connection portion 407 of each of the terminals 40 extends downward. In addition, the first aperture 541 is located downward of the second aperture 543, and the third aperture 545 is located downward of the fourth aperture 547. Nevertheless, the aforementioned embodiment is easier to assemble owing to a positional relationship between the locking arm 537 and the locator 60.

Although the connector 20 is a straight type connector in which a mating direction thereof is identical with or parallel to an extending direction of the cable 80 in the aforementioned embodiment, the connector 20 may be a right-angled type connector in which the mating direction thereof is perpendicular to the extending direction of the cable 80. In that case, the first direction is identical with the front-rear direction, and the second direction is identical with the up-down direction.

Although the guide portion 341 and the guided portion 66 only guide movement of the locator 60 in the aforementioned embodiment, they may be further provided with a locking mechanism which strengthens function for maintaining the locator 60 at the second position.

Although the first direction and the second direction are perpendicular to each other in the aforementioned embodiment, they may slightly intersect with each other provided that a space for movement of the locator 60 is secured.

Although the supplementary protruding portions 629 are provided on the side surfaces of the main portion 62 of the locator 60 in the aforementioned embodiment, they may be supported by supporting portions, respectively in the same manner as the protruding portions 641. In addition, each of the supplementary protruding portions 629 may have a shape similar to that of the protruding portion 641.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector which is attachable to an electric wire, wherein:

the connector is mateable with a mating connector provided with a mating terminal;

the connector comprises a housing, at least one terminal, a shell and a locator;

the terminal is held by the housing;

the terminal has a contact portion which is brought into contact with the mating terminal when the connector is mated with the mating connector and a connection portion to be connected to the electric wire;

the shell is made of metal and has two side wall portions which are located apart from each other in a width direction;

each of the side wall portions is provided with a first aperture and a second aperture;

the first aperture and the second aperture pierce the side wall portion in the width direction and are located apart from each other in a first direction perpendicular to the width direction;

the locator is attached to the shell so that the locator is movable from a first position to a second position in the first direction;

the locator is provided with a first end face, a second end face, a receiving aperture, an admitting portion and two protruding portions;

the first end face and the second end face are located on both ends of the locator in a second direction which is perpendicular to the width direction and intersects with the first direction;

the receiving aperture pierces the locator from the second end face to the first end face and is receivable an end of the electric wire;

the admitting portion communicates with the receiving aperture and allows the connection portion to be moved therein when the locator is moved;

the protruding portions correspond to the side wall portions, respectively;

each of the protruding portions protrudes outward in the width direction;

when the locator is positioned at the first position, each of the protruding portions is positioned in the first aperture of the side wall portion corresponding thereto; and when the locator is positioned at the second position, each of the protruding portions is positioned in the second aperture of the side wall portion corresponding thereto while the connection portion is positioned in the receiving aperture in part.

2. The connector as recited in claim 1, wherein:

the connection portion is an insulation displacement connection piece which extends in the first direction and has a forked shape;

the locator has a main portion and two supporting portions extending in the first direction from the main portion;

the receiving aperture is provided in the main portion;

the supporting portions are resiliently deformable and correspond to the protruding portions, respectively;

each of the protruding portions is supported by the supporting portion corresponding thereto and movable at least in the width direction; and when each of the protruding portions is positioned in the second aperture of the side wall portion corresponding thereto, movement of the locator from the second position to the first position is regulated.

3. The connector as recited in claim 1, wherein:

the housing has a receiving surface intersecting with the second direction;

the receiving surface of the housing and the side wall portions of the shell form an accommodation portion which accommodates the locator;

when the locator is positioned at the second position, a range occupied by the receiving aperture is covered by a range occupied by the receiving surface in the first direction; and when the locator is positioned at the first position, the range occupied by the receiving aperture overlaps with the range occupied by the receiving surface in the first direction while a part of the range occupied by the receiving aperture is out of the range occupied by the receiving surface in the first direction.

4. The connector as recited in claim 1, wherein:

the housing has a receiving surface intersecting with the second direction;

the receiving surface of the housing and the side wall portions of the shell form an accommodation portion which accommodates the locator;

in the second direction, the first end face of the locator is closer to the receiving surface of the housing than the second end face of the locator is;

when the locator is positioned at the first position, the end of the electric wire inserted in the receiving aperture is able to be brought into abutment with the receiving surface; and in the second direction, a gap is left between the first end face of the locator and the receiving surface of the housing.

5. The connector as recited in claim 1, wherein:

each of the side wall portions of the shell is provided with a third aperture and a fourth aperture;

the third aperture and the fourth aperture pierce the side wall portion in the width direction and are located apart from each other in the first direction;

the first aperture and the third aperture are located apart from each other in the second direction;

the second aperture and the fourth aperture are located apart from each other in the second direction;

the locator is provided with two supplementary protruding portions;

the supplementary protruding portions correspond to the side wall portions, respectively;

each of the supplementary protruding portions protrudes outward in the width direction;

the supplementary protruding portions are located apart from the protruding portions in the second direction;

when the locator is positioned at the first position, each of the supplementary protruding portions is positioned in the third aperture of the side wall portion corresponding thereto; and when the locator is positioned at the second position, each of the supplementary protruding portions is positioned in the fourth aperture of the side wall portion corresponding thereto.

6. The connector as recited in claim 5, wherein the third aperture and the fourth aperture overlap with the connection portion of the terminal in the second direction.

7. The connector as recited in claim 1, wherein:

the locator is provided with a guided portion extending in the first direction; and the housing is provided with a guide portion which receives and guides the guided portion.

8. The connector as recited in claim 1, wherein the shell is provided with a swaging portion which holds the electric wire.

9. A connector attached electric wire comprising the connector as recited in claim 1, wherein the connector is attached to the electric wire.

10. A connector attached electric wire comprising the connector as recited in claim 2, wherein the connector is attached to the electric wire.

11. A connector attached electric wire comprising the connector as recited in claim 3, wherein the connector is attached to the electric wire.

12. A connector attached electric wire comprising the connector as recited in claim 4, wherein the connector is attached to the electric wire.

13. A connector attached electric wire comprising the connector as recited in claim 5, wherein the connector is attached to the electric wire.

14. A connector attached electric wire comprising the connector as recited in claim 6, wherein the connector is attached to the electric wire.

15. A connector attached electric wire comprising the connector as recited in claim 7, wherein the connector is attached to the electric wire.

16. A connector attached electric wire comprising the connector as recited in claim 8, wherein the connector is attached to the electric wire.

* * * * *